No. 682,980. Patented Sept. 17, 1901.
P. EBELING.
METHOD OF FORMING HOLLOW GLASS ARTICLES.
(Application filed Dec. 8, 1900.)
(No Model.) 2 Sheets—Sheet 2.
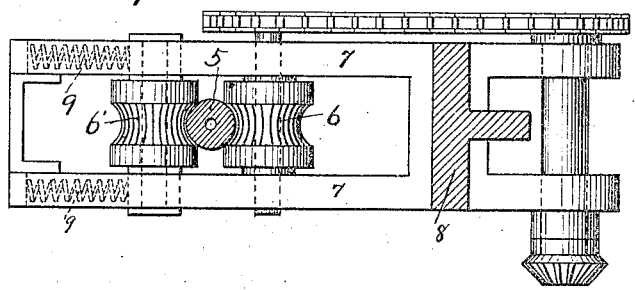
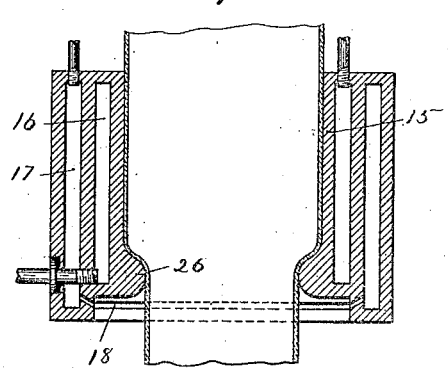
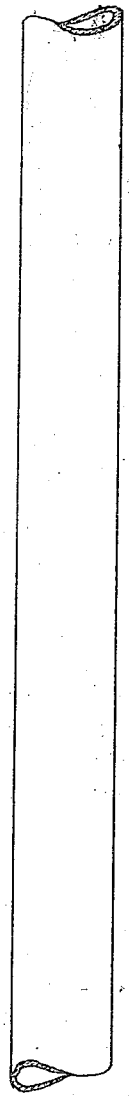
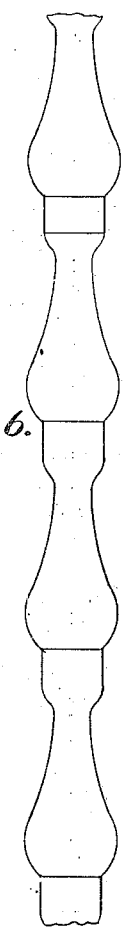
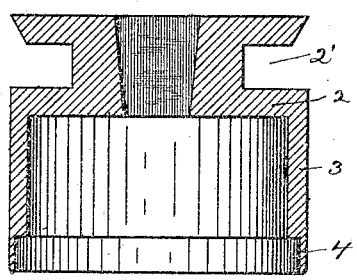
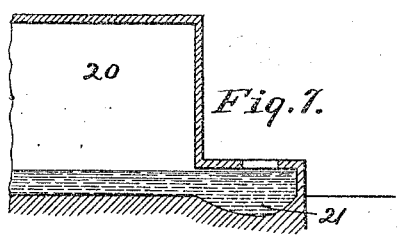
Witnesses: Inventor:
Phillip Ebeling
Attorney.

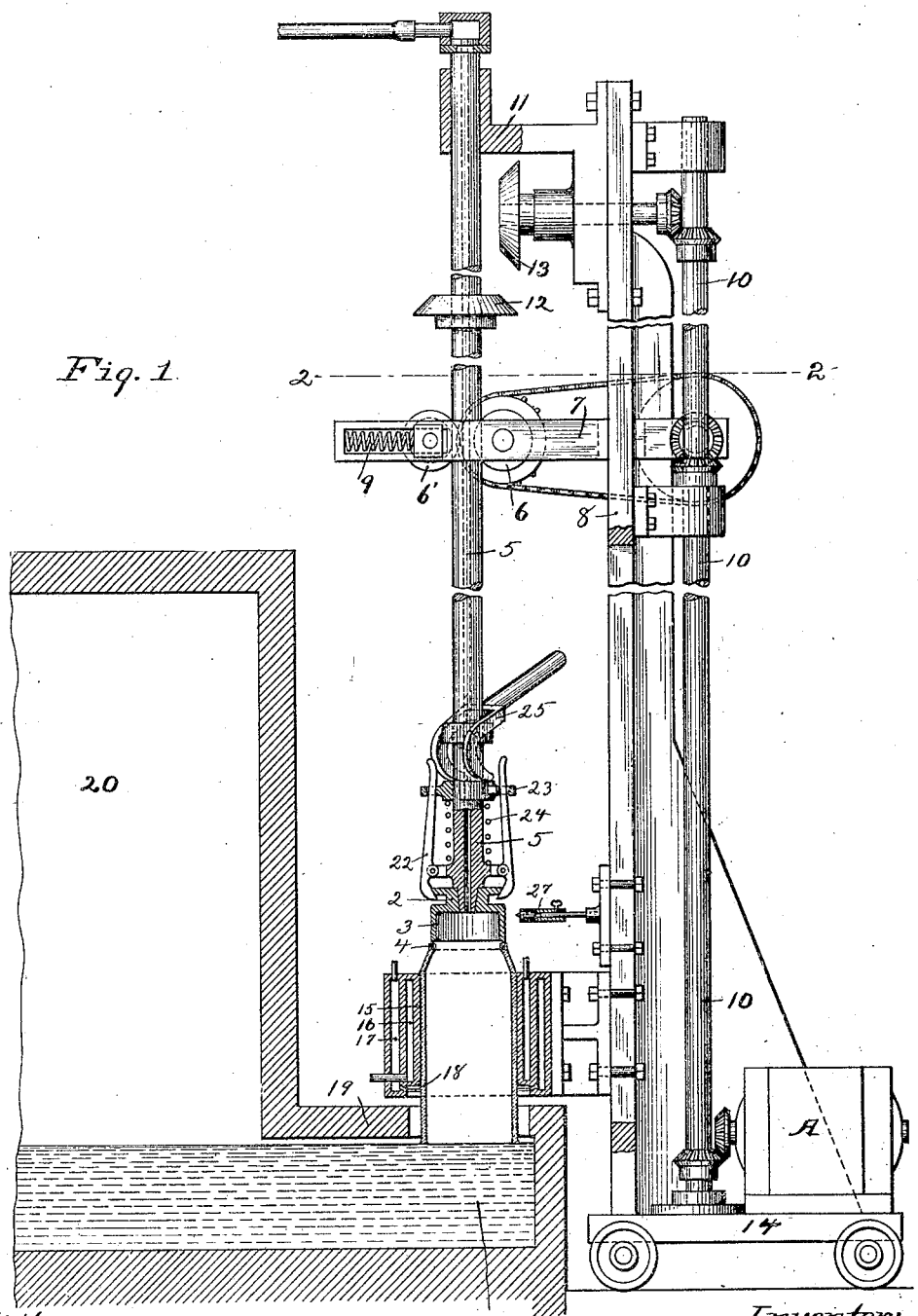

UNITED STATES PATENT OFFICE.

PHILLIP EBELING, OF FINDLAY, OHIO.

METHOD OF FORMING HOLLOW GLASS ARTICLES.

SPECIFICATION forming part of Letters Patent No. 682,980, dated September 17, 1901.

Application filed December 8, 1900. Serial No. 39,123. (No model.)

*To all whom it may concern:*

Be it known that I, PHILLIP EBELING, a citizen of the United States, residing at Findlay, in the county of Hancock and State of Ohio, have invented new and useful Improvements in Methods of Forming Hollow Glass Articles, of which the following is a specification.

This invention relates to an improved method of forming window-glass cylinders, glass pipe or tubing, and other hollow glass articles without ladling, pouring, dividing, or other manipulation of the glass prior to working.

The invention consists in drawing or passing the blank through a mold immediately upon being formed to more effectually secure uniformity in diameter, as in the manufacture of cylinders and tubing, and also for the purpose of forming the tubular blank into a succession of connected articles of irregular form, such as lamp-chimneys.

The invention consists, further, in the manner of controlling the thickness of the tubular blank and in other novel steps in the process of manufacture, all as herein fully described and claimed.

An apparatus for practicing the improved method is illustrated by the accompanying drawings, wherein—

Figure 1 is a broken elevation, partly in section, of the apparatus in operative position over a furnace. Fig. 2 is a cross-sectional view on line 2 2 of Fig. 1. Fig. 3 is a sectional view of the mold. Fig. 4 is a similar view of the drawing-head. Fig. 5 is an elevation of a portion of a cylindrical blank. Fig. 6 is a similar view of a blank molded into a succession of lamp-chimneys. Fig. 7 is a sectional view of a portion of a furnace of modified form.

Referring to the drawings, 2 designates a drawing-head formed with a depending tubular part 3, reduced in thickness at its extremity, as shown at 4. Head 2 is removably secured to the lower end of pipe 5, which extends vertically between roughened rolls 6 and 6', mounted in lateral extension 7 of upright frame 8. Roll 6' is slidable in the roll extension, springs 9 holding it constantly against the pipe. Roll 6 is mounted in fixed bearings and is suitably geared to vertical power-shaft 10. With the rolls thus gripping the pipe the latter is moved vertically through a guide 11, which holds it perpendicular. A bevel friction-gear 12 is adjustable on pipe 5 and adapted to be raised thereby into engagement with a similar gear 13, journaled in frame 8. Gear 13 is actuated by shaft 10 through suitable interposed gearing. Frame 8 may be mounted on a truck 14, which may also carry an electric motor A for driving shaft 10. Vertically adjustable on the lower portion of upright 8 and in line centrally with drawing-head 2 is mold 15, having water-jacket 16 for maintaining the mold at an even temperature, and surrounding the water-jacket is an air-jacket 17, which protrudes slightly below the mold, where it is formed on its inner face with a continuous slot 18. The apparatus is preferably constructed with mold 15 in overhanging position to coöperate with a tank-furnace of special design in order that the mold may have position immediately above the surface of the molten glass in the tank or other furnace. To this end a portion 19 of tank-furnace 20 is made shallow, having only sufficient depth to accommodate the molten glass and formed in its crown with a working hole 21. Excepting in the depth of its working portion the tank does not differ in construction from those usually employed in the manufacture of glass. This working portion may have a straight bottom or floor, as in Fig. 1, or the floor may be scooped out to provide greater working depth, as shown at 21, Fig. 7. Head 2 may be secured to pipe 5 by any suitable device or coupling, the device here shown being a snap consisting of opposite levers 22, grasping at their lower ends the said head and at their upper ends extending through slide 23 on pipe 5 and adapted to be depressed against the pressure of spring 24 to open the levers and release the head. A cam-lever 25 is shown for depressing the slide.

In operation the apparatus is positioned with the mold directly over working opening 21, as in Fig. 1. Pipe 5 is then lowered to submerge reduced extremity 4 of the drawing-head in the molten glass and to which the glass adheres. Pipe 5 is then slowly elevated by rolls 6 and 6', and as the glass adheres to the drawing-head it is drawn from the surface of the molten mass in the shape of a tubular blank which continues to form as long as the blank is drawn upward. Thus a blank tube of any desired length may be formed. Immediately upon leaving the furnace the blank is drawn into and through mold 15, the latter being maintained at proper temperature by the water-jacket and the temperature of the latter in turn being minimized by the air-jacket surrounding it. As the blank passes into the mold it is subjected exteriorly to a blast of air emitted by slot 18 of the air-jacket, and the air is so controlled that the glass may be chilled only slightly, and hence be drawn into a thin tube, or the blast may be stronger, so as to chill the glass to such a degree as to resist elongation in the drawing process, thereby forming a thicker blank. The lower end of the mold-cavity may be contracted, as at 26, Fig. 4, to retard free upward movement of the blank and cause it to elongate into a thin blank under the drawing process. It will be understood that while the tube is being formed air is forced thereinto from pipe 5, the upper extremity of the latter having flexible connection with a source of compressed air. (Not shown.) In the manufacture of window-glass cylinders, tubing, and other straight bodies the blank is drawn through mold 15 and into the length desired, gear 12 being adjusted accordingly, and when pipe 5 has been elevated sufficiently to engage gears 12 and 13 the pipe and blank are rotated, causing the lower extremity of the latter to part or separate from the molten glass in the tank. The drawing-head is then detached from pipe 5 and the blank removed. A fresh drawing-head is then attached, and the apparatus is ready to repeat the operation. The head may be formed with an annular depression 2' to receive a fork or other device (not shown) for effecting its removal. A laterally-adjustable diamond or other scoring device 27, secured to frame 8 and adjustable thereon, may be used for scoring the blank during the upward or drawing movement preparatory to cracking, as in the manufacture of window-glass cylinders, or said device may be adjusted to score the blank circumferentially while being rotated, as when it is desired to divide the blank into sections. The depending tubular portion 3 and edge 4 of the drawing-head are essentially continuous and preferably circular for starting the formation of a tubular or hollow blank, and the initial thickness of the latter may be determined by the thickness of reduced edge 4, to which the glass adheres. Hence if a heavy or thick edge is desired said edge will be proportionately thick, while for a thinner blank the edge will be of smaller gage. The cavity of the mold here shown is straight or cylindrical for imparting corresponding shape to the cylinders or tubes drawn uninterruptedly therethrough. In the formation of articles of irregular form, such as lamp-chimneys, the drawing movement is necessarily intermittent to permit the tube to be expanded into the cavities of the matrix, the mold in such case being in sections to release the chimney-blanks as they are formed. A blank thus formed into a succession of chimneys is shown in Fig. 6. It will be understood that successions of other articles open at both ends may be similarly formed, lamp-chimneys being simply referred to for the purpose of illustration.

Having thus fully described my invention, what I claim, and desire to secure by Letters Patent, is—

1. The method of forming hollow glass articles, consisting in drawing a tubular blank directly from a constantly-maintained source of molten-glass supply; expanding the blank; and shaping the blank by operation on the exterior surface thereof adjacent its source.

2. The method of forming hollow glass articles, consisting in drawing molten glass into a tubular blank, simultaneously chilling the blank adjacent its source; expanding the blank; and shaping the blank by operating on its exterior face.

3. The method of forming hollow glass articles, consisting in drawing molten glass vertically upward into a tubular blank; simultaneously chilling the blank adjacent its source; expanding the blank; and shaping the blank by operating on its exterior face.

4. The method of forming hollow glass articles, consisting of the following operations performed simultaneously; drawing molten glass into a tubular blank; chilling the blank adjacent its source; expanding the blank; and shaping the blank by operating on its exterior face.

5. The method of forming hollow glass articles, consisting in drawing molten glass into a tubular blank; retarding the longitudinal movement of the blank to elongate or thin it; and expanding the blank.

6. The method of forming a series of connected hollow glass articles, consisting in successively drawing molten glass into a tubular blank; expanding the blank so formed; and operating on the exterior face of the blank adjacent its source to form the connected articles.

In testimony whereof I have hereunto set my hand in presence of two subscribing witnesses.

PHILLIP EBELING.

Witnesses:
C. HEYN,
WM. F. DUNCAN.